United States Patent Office 3,014,039
Patented Dec. 19, 1961

3,014,039
9-[ω-N-(ω-DIALKYLAMINOALKYL)AMINOALKYL]-9-PYRID[3,4-b]-INDOLES AND DERIVATIVES
Richard A. Robinson, Evanston, Ill., assignor to G. D. Searle & Co., Chicago, Ill., a corporation of Delaware
No Drawing. Filed Sept. 29, 1959, Ser. No. 843,059
8 Claims. (Cl. 260—296)

The present invention is concerned with novel tribasic heterocyclic amines and, more particularly, with 9-(ω-aminoalkyl)-9-pyrid[3,4-b]indoles substituted on the side chain nitrogen by a dialkylaminoalkyl moiety, as represented by the structural formula

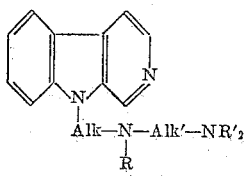

wherein R is selected from the group consisting of hydrogen and lower alkyl radicals, R' is a lower alkyl radical, and Alk and Alk' are lower alkylene radicals.

Lower alkyl radicals represented by R and R' are exemplified by methyl, ethyl, propyl, butyl, pentyl, hexyl, and the branched-chain isomers thereof. The lower alkylene radicals encompassed by Alk and Alk' are, typically, methylene, ethylene, trimethylene, tetramethylene, pentamethylene, and the branched-chain isomers thereof.

A suitable starting material for the manufacture of the instant 9-(N-substituted 3-aminopropyl)-9-pyrid-[3,4-b]indoles is 9-(2-cyanoethyl)-9-pyrid[3,4-b]indole. By a novel process the latter nitrile is reductively aminated with a dialkylaminoalkylamine and hydrogen in the presence of a suitable hydrogenation catalyst to afford the 9-(N-substituted 3-aminopropyl) compounds of this invention. As a specific example of this process, 9-(2-cyanoethyl)-9-pyrid[3,4-b]indole is treated with 2-dimethylaminoethylamine in a hydrogen atmosphere in the presence of platinum oxide and activated Raney nickel catalysts at room temperature to afford 9-[3-N-(2-dimethylaminoethyl)aminopropyl]-9-pyrid[3,4-b]indole.

An alternative process for the preparation of the N-dialkylaminoalkyl 3-aminopropyl compounds of this invention is the condensation of a dialkylaminoalkyl halide with 9-(3-aminopropyl)-9-pyrid[3,4-b]indole. For instance, 9-(3-aminopropyl)-9-pyrid[3,4-b]indole is alkylated with 3-dimethylaminopropyl chloride, resulting in 9-[3-N-(3-dimethylaminopropyl)aminopropyl]-9-pyrid-[3,4-b]indole.

The compounds of this invention wherein Alk is other than a trimethylene radical are preferably obtained by the condensation of a dialkylaminoalkylamine with a 9-(ω-haloalkyl)-9-pyrid[3,4-b]indole. The latter halides are obtained by the reaction of 9-pyrid-[3,4-b]indole with an ω-haloalkanol ester. For example, reaction of the aforementioned 9-pyrid[3,4-b]indole with 4-chlorobutanol p-toluenesulfonate results in 9-(4-chlorobutyl)-9-pyrid-[3,4-b]indole. This halide is condensed with, for example, 3-dimethylaminopropylamine, to yield 9-[4-N-(3-dimethylaminopropyl)aminobutyl]-9-pyrid[3,4 - b]indole.

The N-dialkylaminoalkyl-N-alkyl compounds of this invention are manufactured by alkylation of the aforementioned 9 - [ω - N - (dialkylaminoalkyl)aminoalkyl]-9-pyrid[3,4-b]indoles. 9 - [3 - N - (2-dimethylaminoethyl)-aminopropyl]-9-pyrid[3,4-b]indole, for example, is treated with formic acid and formaldehyde to afford 9-{3-[N-(2-dimethylaminoethyl) - N - methyl]aminopropyl}-9-pyrid-[3,4-b]indole.

Equivalent embodiments of this invention are non-toxic acid salts and quaternary ammonium salts of the instant bases as exemplified by the hydrochloride, hydro-bromide, maleate, tartrate, citrate, ascorbate, methochloride, ethiodide, methosulfate, etc.

The compounds of this invention are useful as result of their valuable pharmacological properties. They have, for example, hormonal properties as evidenced by their ability to inhibit the local edema formation associated with inflammatory states. In addition, they are antifungal and ganglion-blocking agents, and are also central nervous system depressants.

The invention will appear more fully from the examples which follow. These examples are set forth by way of illustration only and it will be understood that the invention is not to be construed as limited in spirit or scope by the details contained therein, as many modifications in materials and methods will be apparent from this disclosure to those skilled in the art. In these examples, temperatures are given in degrees centigrade (° C.). Quantities of materials are expressed in parts by weight unless otherwise noted.

Example 1

A mixture of 18 parts of 9-(2-cyanoethyl)-9-pyrid-[3,4-b]indole, 130 parts of 2-dimethylaminoethylamine, 1 part of platinum oxide, 35 parts of "W-5" Raney nickel catalyst (prepared as described by Adkins and Billica, J.A.C.S., 70, 695 (1948)), 30 parts of acetic acid and 2000 parts of methanol is stirred in a hydrogen atmosphere until the uptake of hydrogen ceases. The catalyst is removed by filtration and the filtrate evaporated to dryness in vacuo. The residue is dissolved in water and the resulting solution made alkaline by the addition of aqueous sodium hydroxide. The liberated free base is extracted into ether and the organic solution dried over solid sodium hydroxide. Addition of solid carbon dioxide to this ether solution precipitates unreacted starting material, which is removed by filtration. The filtrate is treated with 30 parts of maleic acid to produce the maleate salt, which is recrystallized from methanol to afford pure 9-[3-N-(2-dimethylaminoethyl) - aminopropyl]- 9 - pyrid[3,4-b]indole maleate, M.P. 163°.

By substituting an equivalent quantity of 3-diethylaminopropylamine and otherwise proceeding according to the herein described processes, 9-[3-N-(3-diethylaminopropyl)aminopropyl]-9-pyrid[3,4-b]indole maleate is obtained.

Example 2

A mixture of 4.1 parts of 9-(3-aminopropyl)-9-pyrid-[3,4-b]indole, 1.08 parts of 2-dimethylaminoethyl chloride and 50 parts of chloroform is allowed to stand at room temperature for about 48 hours. The mixture is filtered to remove the crystalline 9-(3-aminopropyl)-9-pyrid-[3,4-b]indole hydrochloride and the filtrate evaporated to dryness in vacuo. The residue is extracted into ether and this organic solution treated with solid carbon dioxide to remove unreacted starting material. To the ether filtrate is added maleic acid to precipitate the maleate salt which is identical with the product obtained in Example 1.

Example 3

To a mixture of 105 parts of p-toluenesulfonyl chloride and 108 parts of 4-chloro-1-butanol is added, at 10–16° with stirring, a solution of 32 parts of sodium hydroxide in 150 parts of water. Stirring is continued for about one hour, then another portion of 105 parts of p-toluenesulfonyl chloride followed by 32 parts of sodium hydroxide in 150 parts of water added. This mixture is stirred for about 3 hours, then extracted with ether. The organic extract is washed successively with water and aqueous sodium hydroxide, dried over anhydrous sodium sulfate and evaporated to dryness in vacuo to afford 4-chlorobutyl-p-toluenesulfonate.

To a stirred suspension of 8 parts of 9-pyrid-[3,4-b]-indole in 160 parts of dry benzene is added a freshly prepared solution of 4.4 parts of phenyllithium in 120 parts of dry ether. This mixture is stirred for about 2 hours then treated with a solution of 12.9 parts of 4-chlorobutyl p-toluenesulfonate in 50 parts of dry benzene. After stirring for about 24 hours, ice water is added; then the organic layer separated, washed with water, dried over anhydrous sodium sulfate, and concentrated to dryness at reduced pressure. This residue is dissolved in butanone and mixed with a solution of 16.9 parts of 2-dimethyl-aminoethylamine in 100 parts of butanone. The resulting mixture is heated at reflux for about 8 hours, allowed to stand at room temperature for about 24 hours, then distilled in vacuo to remove the solvent. Ice and aqueous potassium carbonate are added and the mixture extracted with chloroform. The organic layer is washed with water, dried over anhydrous sodium sulfate and concentrated to dryness in vacuo to afford 9-[4-N-(2-dimethylaminoethyl)aminobutyl]-9-pyrid[3,4-b]indole as an oil.

Example 4

A mixture of 8.5 parts of 9-[3-N-(2-dimethylaminoethyl)aminopropyl]-9-pyrid[3,4-b]indole, 10 parts of 90% formic acid, and 2.4 parts of 38% aqueous formaldehyde is heated at reflux for about 7½ hours, then at reduced pressure to remove volatile material. The residue is dissolved in water and the solution made alkaline with potassium carbonate. The liberated free base is extracted into ether and the organic solution washed with water and dried over solid sodium hydroxide. Distillation of the ether affords 9-{3-[N-(2-dimethylaminoethyl)-N-methyl]aminopropyl}-9-pyrid[3,4-b]indole which is converted to its trihydrochloride, M.P. 257°, by dissolution in ethanol and treatment with propanolic hydrogen chloride.

Example 5

A mixture of 1.75 parts of 9-[3-N-(2-dimethylaminoethyl)aminopropyl]-9-pyrid[3,4-b]indole, one part of ethyl iodide, 0.9 part of potassium carbonate, and 75 parts of dry benzene is heated at reflux for about 5 hours. The reaction mixture is cooled, washed with water, dried over anhydrous sodium sulfate, and concentrated to dryness to yield 9-{3-[N-(2-dimethylaminoethyl)-N-ethyl]-amino}-9-pyrid[3,4-b]indole as an oil.

Example 6

A mixture of 6 parts of 9-{3-[N-(2-dimethylaminoethyl) - N - methyl]aminopropyl} - 9-pyrid[3,4-b]indole, 2 parts of methyl chloride, and 100 parts of methanol is allowed to stand in a closed system at room temperature for about 60 hours. The mixture is then heated at 60° for about 8 hours. The solvent is removed by distillation in vacuo and the product crystallized from tertiary amyl alcohol, then recrystallized from isopropanol to afford 9-{3-[N-(2-dimethylaminoethyl) - N - methyl]aminopropyl}-9-pyrid[3,4-b]indole methochloride, M.P. 211°.

What is claimed is:
1. 9-[3 - N - (2 - dimethylaminoethyl)aminopropyl]-9-pyrid[3,4-b]indole.
2. 9-{3 - [N - (2 - dimethylaminoethyl) - N - methyl]-aminopropyl}-9-pyrid[3,4-b]indole.
3. A compound of the formula

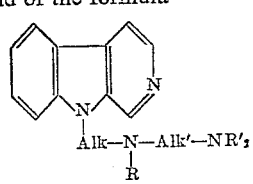

wherein R is selected from the group consisting of hydrogen and lower alkyl, R' is lower alkyl, and Alk and Alk' are lower alkylene of 2 to 5 carbon atoms.

4. A compound of the formula

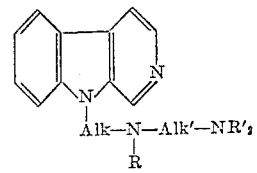

wherein Alk and Alk' are lower alkylene of 2 to 5 carbon atoms and R and R' are lower alkyl.

5. A compound of the formula

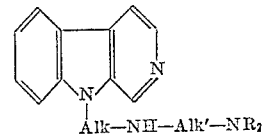

wherein Alk and Alk' are lower alkylene of 2 to 5 carbon atoms and R is lower alkyl.

6. A compound of the formula

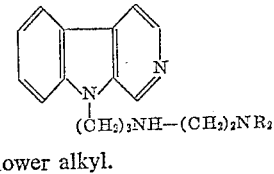

wherein R is lower alkyl.

7. A compound of the formula

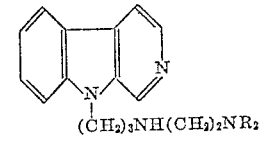

wherein R is lower alkyl.

8. A process for the manufacture of a compound of the formula

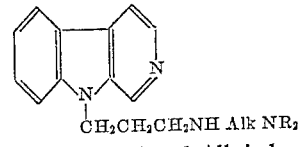

wherein R is a lower alkyl and Alk is lower alkylene of 2 to 5 carbon atoms, which consists of contacting a compound of the formula

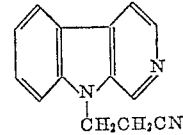

with an alphatic diamine of the formula

wherein R and Alk have the same meanings as defined supra, in a hydrogen atmosphere in the presence of platinum oxide and Raney nickel catalysts.

References Cited in the file of this patent
UNITED STATES PATENTS 2,688,022    Burtner    Aug. 31, 1954
2,767,179    Cavallito et al.    Oct. 16, 1956

OTHER REFERENCES

Kermack et al., J. Chem. Soc., vol. 1940, pages 314–18 (1940).